ns009540534B2

(12) United States Patent
Xiao et al.

(10) Patent No.: US 9,540,534 B2
(45) Date of Patent: Jan. 10, 2017

(54) SEALANT AND METHOD OF PREPARING THE SAME

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Ang Xiao, Beijing (CN); Shanshan Wang, Beijing (CN); Dengguo Xia, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 14/361,859

(22) PCT Filed: May 31, 2013

(86) PCT No.: PCT/CN2013/076599
§ 371 (c)(1),
(2) Date: May 30, 2014

(87) PCT Pub. No.: WO2014/153835
PCT Pub. Date: Oct. 2, 2014

(65) Prior Publication Data
US 2015/0252208 A1  Sep. 10, 2015

(30) Foreign Application Priority Data
Mar. 25, 2013 (CN) .......................... 2013 1 0097721

(51) Int. Cl.
*C08F 2/46* (2006.01)
*C08F 2/50* (2006.01)
*C08G 61/04* (2006.01)
*C09D 133/14* (2006.01)
*G02F 1/1339* (2006.01)
*C09J 4/06* (2006.01)
*C09J 133/06* (2006.01)
*C08K 7/28* (2006.01)

(52) U.S. Cl.
CPC .............. *C09D 133/14* (2013.01); *C08K 7/28* (2013.01); *C09J 4/06* (2013.01); *C09J 133/06* (2013.01); *G02F 1/1339* (2013.01)

(58) Field of Classification Search
CPC ....... C09D 133/14; G02F 1/1339; C08K 7/28; C09J 4/06; C09J 133/06
USPC ........... 522/44, 33, 6, 71, 189, 184, 1; 520/1
See application file for complete search history.

(56) References Cited

U.S. PATENT DOCUMENTS

| 2002/0194807 | A1* | 12/2002 | Nelson et al. ............... 52/582.1 |
| 2003/0175497 | A1* | 9/2003 | Kobe et al. ................. 428/317.9 |
| 2003/0211291 | A1* | 11/2003 | Castiglione et al. ......... 428/172 |
| 2006/0243363 | A1  | 11/2006 | Hunter et al. |
| 2014/0350136 | A1* | 11/2014 | Xiao et al. ...................... 522/43 |

FOREIGN PATENT DOCUMENTS

| CN | 101571650 A | 11/2009 |
| CN | 102766047 | * 11/2012 |
| CN | 102766047 A | 11/2012 |
| CN | 102775921 A | 11/2012 |
| JP | 2009-114424 A | 5/2009 |
| KR | 20090040221 A | 4/2009 |

OTHER PUBLICATIONS

Written Opinion of the International Searching Authority dated Dec. 25, 2013; PCT/CN2013/076599.
Second Chinese Office Action Appln. No. 201310097721.4; Dated Apr. 16, 2015.
China Patent Certificate issued Oct. 14, 2015, ZL 2013 1 0097721.4.
Korean Office action dated Nov. 30, 2015; Appln. No. 10-2014-7016862.
Extended European Search Report dated Sep. 26, 2015; Appln. No. 13856066.9-1308/2980178 PCT/CN2013076599.

* cited by examiner

*Primary Examiner* — Ling Choi
*Assistant Examiner* — Jessica E Whiteley
(74) *Attorney, Agent, or Firm* — Ladas & Parry LLP

(57) ABSTRACT

Embodiments of the present invention provide a frame sealant and a method of preparing the same. The frame sealant includes 60-70 wt % of a low-viscous epoxy-acrylic photocurable resin, 1-5 wt % of an epoxy resin, 0.5-1 wt % of a photoinitiator, 5-10 wt % of a thermocuring agent, 1-2 wt % of a coupling agent, 5-10 wt % of organic powders, 5-10 wt % of inorganic powders, and 1-5 wt % of porous glass microspheres treated with a safe gas. The method includes: mixing the components of the frame sealant to produce a mixture; compounding the mixture; and debubbling the compounded mixture.

10 Claims, 1 Drawing Sheet

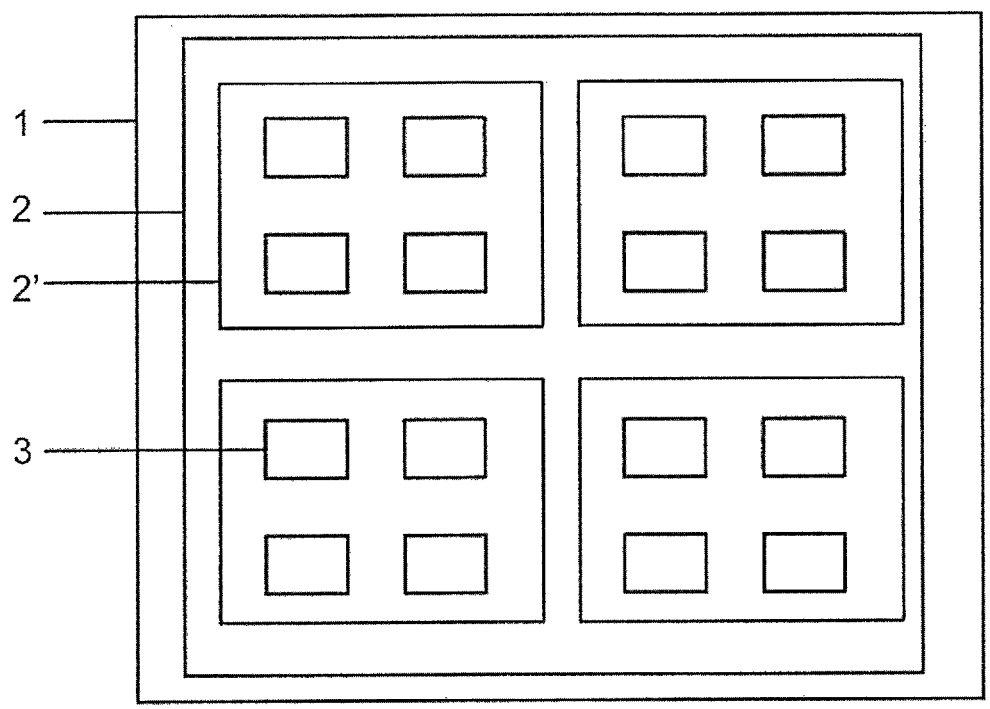

SEALANT AND METHOD OF PREPARING THE SAME

TECHNICAL FIELD

An embodiment of the present invention relates to a frame sealant and a method of preparing the same.

BACKGROUND

Frame sealant is a key material during cell assembly process of liquid crystal panels. Frame sealant applied onto different sites will produce different effects. As shown in FIG. 1, the reference sign 1 represents edges of the whole glass substrate; 2 represents a substrate peripheral frame sealant (i.e., a frame sealant applied at the periphery of the whole substrate); 2' represents a sub-substrate peripheral frame sealant (i.e., frame sealants applied at the peripheries of a plurality of small substrates attached to the same substrate) for preventing the edges of substrates and sub-substrates from bending deformation due to the self-weight of glass; 3 represents a primary frame sealant (i.e., a frame sealant applied at the periphery of the liquid crystal) serving as sealing the liquid crystal panels, reducing the contamination of the liquid crystal within the cell caused by external environment, and bonding the color film substrate and the array substrate.

During the cell assembly process, a color substrate (or an array substrate) having a frame sealant applied thereon, together with an array substrate (or a color film substrate) having liquid crystal applied thereon is first subject to cell assembling under vacuum, and then the frame sealant undergoes photo-curing and thermal curing with UV radiation and heating, thereby completing the cell assembling process. Moreover, during the cell assembling under vacuum, it should be ensured that there is only liquid crystal, without any residual gas, present in the sealing space formed by the primary frame sealant. As neither the substrate frame sealant nor the sub-substrate frame sealant has an opening, each of the space between the substrate peripheral frame sealant 2 and the sub-substrate peripheral frame sealant 2' and the space between the sub-substrate peripheral frame sealant 2' and the primary sealant 3 are under vacuum. Before the UV radiation and heating, the frame sealant is not yet cured, and the liquid crystal at the inner side of the primary frame sealant applies a certain pressure to the sealant, thereby resulting in that the pressure at the inner side the primary frame sealant is greater than that at the outer side of the primary frame sealant. The pressure difference between both sides will causes many problems, such as, impact of liquid crystal on un-cured frame sealant (briefly referred to as "liquid crystal puncture"), deformation (or even breakdown) of frame sealant, decreasing of the bonding force of frame sealant, and contamination of frame sealant to liquid crystal.

For solving the aforesaid problems caused by the pressure difference between the inner and outer sides of the primary frame sealant, it is conventional means to design openings in the substrate peripheral frame sealant and the sub-substrate peripheral frame sealant, through which external gases enter into all the regions except the inside of the primary frame sealant, so that the pressures inside and outside the primary frame sealant tends to equilibrium, thereby avoiding or alleviating the aforesaid problems of liquid crystal puncture.

However, for preventing the etching solution from entering into the sub-substrates to corrode the substrate during subsequent reduction process, the openings in the substrate peripheral frame sealant and the sub-substrate peripheral frame sealant need to be re-sealed, thereby complicating the process and increasing the cost.

SUMMARY

An embodiment of the present invention is capable of inhibiting the occurrence of liquid crystal puncture in the liquid crystal panel and reducing the contamination of the liquid crystal within the cell caused by external environment by providing a frame sealant comprising porous glass microspheres treated with a safe gas and a method of preparing the same. An embodiment of the present invention provides a frame sealant comprising 1 to 5 wt % of porous glass microspheres treated with a safe gas.

For instance, the frame sealant of the present invention can comprise 60-70 wt % of a low-viscous epoxy-acrylic photocurable resin; 1-5 wt % of an epoxy resin; 0.5-1 wt % of a photoinitiator; 5-10 wt % of a thermocuring agent; 1-2 wt % of a coupling agent; 5-10 wt % of organic powders; 5-10 wt % of inorganic powders; and 1-5 wt % of porous glass microspheres treated with a safe gas.

For instance, the aforesaid frame sealant can comprise 60-70 wt % of a low-viscous epoxy-acrylic photocurable resin; 3-5 wt % of an epoxy resin; 0.5-1 wt % of a photoinitiator; 8-10 wt % of a thermocuring agent; 1-2 wt % of a coupling agent; 5-8 wt % of organic powders; 7-10 wt % of inorganic powders; and 2-5 wt % of porous glass microspheres treated with a safe gas.

In the porous glass microspheres treated with a safe gas, the gas can comprise 3-5% by volume of the porous glass microspheres.

The safe gas can be nitrogen, an inert gas, carbon dioxide, or air.

The low-viscous epoxy-acrylic photocurable resin can be represented by the following Formula I, and has a viscosity of 100±50 Pa·s at room temperature:

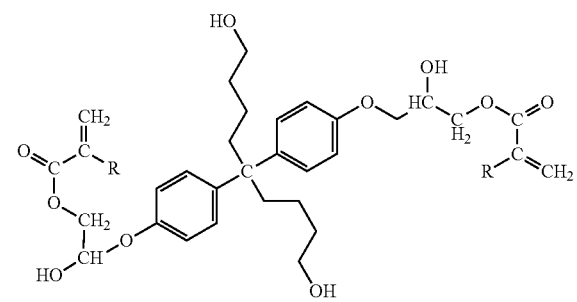

Formula I wherein, each R can be the same or different, and represents H, methyl, or ethyl, respectively.

The frame sealant of the embodiments of the present invention has a viscosity of 250±50 Pa·s at room temperature.

An embodiment of the present invention further relates to a method of preparing the aforesaid frame sealant comprising the steps of:
(1) mixing the components of the frame sealant to produce a mixture;
(2) compounding the mixture; and
(3) debubbling the compounded mixture.
The method can further comprise the step of:
(4) adjusting the viscosity of the debubbled mixture to 250±50 Pa·s at room temperature.

An embodiment of the present invention further relates to use of the aforesaid frame sealant in the production of a liquid crystal panel.

Moreover, an embodiment of the present invention relates to a liquid crystal panel, wherein the aforesaid frame sealant serves as a substrate peripheral frame sealant and/or a sub-substrate peripheral frame sealant.

BRIEF DESCRIPTION OF THE DRAWINGS

FIG. 1 shows a schematic view of the application sites of the frame sealant on the substrate.

DETAILED DESCRIPTION

The embodiments of the present invention will be described clearly and completely hereinafter. It is apparent that the described embodiments represent only a portion of, rather than all of the embodiments of the present invention. Based on the embodiments of the present invention, persons of ordinary skill in the art can obtain other embodiments without creative work, all of which are encompassed within the present invention.

The present disclosure provides a frame sealant comprising 1-5 wt % of porous glass microspheres treated with a safe gas. For instance, the frame sealant can comprise 60-70 wt % of a low-viscous epoxy-acrylic photocurable resin; 1-5 wt % of an epoxy resin, 0.5-1 wt % of a photoinitiator; 5-10 wt % of a thermocuring agent; 1-2 wt % of a coupling agent; 5-10 wt % of organic powders; 5-10 wt % of inorganic powders; and 1-5 wt % of porous glass microspheres treated with a safe gas. For instance, the sealant can comprise 60-70 wt % of a low-viscous epoxy-acrylic photocurable resin; 3-5 wt % of an epoxy resin, 0.5-1 wt % of a photoinitiator; 8-10 wt % of a thermocuring agent; 1-2 wt % of a coupling agent; 5-8 wt % of organic powders; 7-10 wt % of inorganic powders; and 2-5 wt % of porous glass microspheres treated with a safe gas. Moreover, the frame sealant of the present disclosure has a viscosity in a range of 250±50 Pa·s at room temperature.

The porous glass microspheres treated with a safe gas in the frame sealant of the present disclosure can be any porous glass microspheres known in the art that are suitable for being used in a sealant. The safe gas refers to a gas which does not react with any component of the frame sealant or the liquid crystal under light radiation and heat. For instance, the safe gas can be nitrogen, an inert gas, carbon dioxide, air, etc. For instance, the safe gas can be nitrogen. Also, the safe gas can comprise 3-5% by volume of the porous glass microspheres. If the volume percent of the safe gas is less than 3%, its effect of equilibrating the pressures at the inner and outer sides of the primary frame sealant is not significant. If the volume percent is greater than 5%, it is likely to deteriorate the applicability of the frame sealant. Thus, the volume percent of the safe gas is preferably less than 5%. Moreover, the porous glass microspheres can have a diameter of, for example, 1 to 2 microns.

The low-viscous epoxy-acrylic photocurable resin of the frame sealant of the present disclosure can be represented by the following Formula I (see, e.g., CN 102766047A), and has a viscosity of 100±50 Pa·s at room temperature:

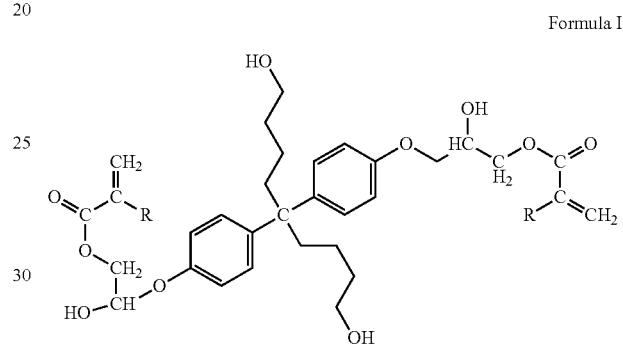

Formula I wherein each R can be the same or different, and can represent H, or $C_1$-$C_4$ alkyl, such as, methyl or ethyl, respectively.

The epoxy resin of the frame sealant of the present disclosure can be any epoxy resin that is commonly used in the art, such as, epoxy resin E-41, E-51, or an epoxy resin represented by the following Formula II:

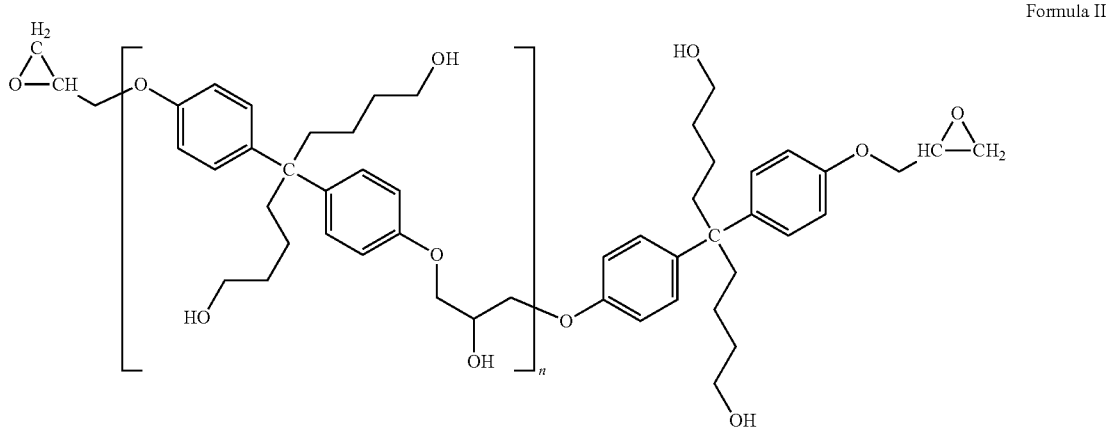

Formula II wherein n represents an integer of 1 to 4.

Moreover, the photoinitiator, thermocuring agent, coupling agent, organic powders, and inorganic powders used in the frame sealant of the present disclosure can be those commonly used in the art, respectively. For instance, The photoinitiator can be alkylphenones, such as, α,α-diethoxy acetophenone, α-hydroxyalkyl phenone, or α-aminoalkyl phenone. The thermocuring agent can be aliphatic polyamines, such as, diaminodiphenylmethane, etc. The coupling agent can be silane-based coupling agents, such as, KH550, KH560, or KH 570 (manufactured by UCC), and the like. The organic powders can be elastic microspheres. The inorganic powder can be silica microspheres.

The present disclosure further relates to a method of preparing the aforesaid frame sealant comprising the steps of:
(1) mixing the components of the frame sealant to produce a mixture;
(2) compounding the mixture; and
(3) debubbling the compounded mixture.

For instance, the mixture can be compounded twice or three times at a temperature of 30° C. to 50° C., and the compounding time can vary appropriately depending on the weight of the final frame sealant. For instance, the compounding time can be about 30 min to 60 min. Moreover, the compounded mixture can be debubbled once or many times. For instance, the pressure in the debubbling box can be less than 500 Pa, and the debubbling time can be about 20 min to 40 min.

For instance, the aforesaid method can further comprise the step of:
(4) adjusting the viscosity of the debubbled mixture to 250±50 Pa·s at room temperature.

In general, within the content ranges of the components of the frame sealant disclosed, the viscosity of the debubbled mixture can be slightly adjusted by using low-viscous epoxy-acrylic photocurable resins having different viscosities as well as organic or inorganic powders, such that the viscosity of the frame sealant can achieve a given value.

The present disclosure further relates use of the aforesaid frame sealant in the production of a liquid crystal panel. In the liquid crystal panel of the present disclosure, the aforesaid frame sealant is used as a substrate peripheral frame sealant and/or a sub-substrate peripheral frame sealant.

The frame sealant of the present disclosure comprises porous glass microspheres treated with a safe gas. Thus, when the frame sealant of the present disclosure is used as a substrate peripheral frame sealant and/or a sub-substrate peripheral frame sealant, during the pressing process of vacuum cell assembling and the process of UV radiation and heating immediately after the vacuum cell assembling, the frame sealant can release the safe gas to resist the pressure at the inner side of the primary sealant caused by the liquid crystal, thereby inhibiting the occurrence of liquid crystal puncture in the liquid crystal panel, and reducing in turn the contamination of the liquid crystal within the cell caused by external environment.

The frame sealants of the present invention will be described with reference to examples Hereinafter. These examples are only illustrative, and should not be interpreted as limiting the scope of the disclosure. It is indicated that all the percents as used herein mean a weight percent, unless otherwise specified.

Example 1

At room temperature, 60% of a low-viscous epoxy-acrylic photocurable resin represented by the following Formula III, 5% of an epoxy resin E-41 (manufacture by Jiangsu Yangnong), 0.5% of α,α-diethoxy acetophenone as a photoinitiator, 10% of diaminodiphenylmethane as a thermocuring agent, 1.5% of a silane-based coupling agent KH550 (manufactured by UCC), 8% of resinous elastic microspheres (manufactured by MSE, America) as organic powders, 10% of silica microspheres (manufactured by 3M, America) as inorganic powders, and 5% of glass microspheres (manufactured by 3M, America, G200) treated with a gas were mixed so that the final frame sealant has a total weight of 200 g. The aforesaid mixture was stirred at room temperature for 30 to 60 minutes (about 40 minutes in this example), and then compounded twice at a temperature of 30° C. to 50° C. (about 40° C. in this example), 30 min to 60 min each time (about 30 minutes in this example). The compounded mixture was debubbled at room temperature for 20 minutes under a pressure of less than 500 Pa in the debubbling box to give the frame sealant of Example 1. The frame sealant has a viscosity in a range of 250±50 Pa·s at a temperature of 23° C. to 25° C.

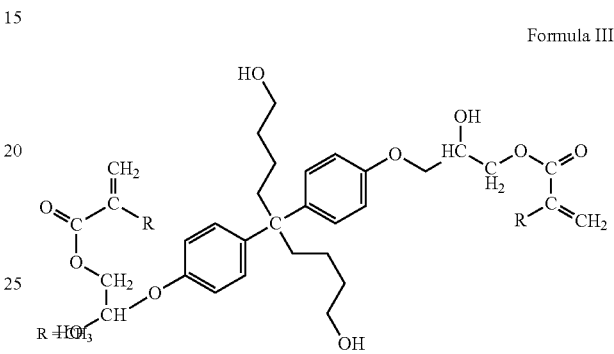

Formula III

Example 2

At room temperature, 66% of a low-viscous epoxy-acrylic photocurable resin represented by the above Formula III, 3 wt % of an epoxy resin E-41 (manufactured by Jiangsu Yangnong), 1% of α,α-diethoxy acetophenone as a photoinitiator, 8% of diaminodiphenylmethane as a thermocuring agent, 2% of a silane-based coupling agent KH550, 8% of resinous microspheres as organic powders, 7% of silica microspheres as inorganic powders, and 5% of glass microspheres (manufactured by 3M, America, G200) treated with a gas were mixed so that the final frame sealant has a total weight of 200 g. The aforesaid mixture was stirred at room temperature for 30 to 60 minutes (about 30 minutes in this example), and then compounded twice at a temperature of 30° C. to 50° C. (about 50° C. in this example), 30 min to 60 min each time (about 40 minutes in this example). The compounded mixture was debubbled at room temperature for 20 minutes under a pressure of less than 500 Pa in the debubbling box to give the frame sealant of Example 2. The frame sealant has a viscosity in a range of 250±50 Pa·s at a temperature of 23° C. to 25° C.

Example 3

At room temperature, 70% of a low-viscous epoxy-acrylic photocurable resin represented by the above Formula III, 5 wt % of an epoxy resin E-41, 1% of α,α-diethoxy acetophenone as a photoinitiator, 8% of diaminodiphenylmethane as a thermocuring agent, 1% of a silane-based coupling agent KH550, 5% of resinous microspheres as organic powders, 8% of silica microspheres as inorganic powders, 2% of glass microspheres (manufactured by 3M, America, G200) treated with a gas were mixed so that the final frame sealant has a total weight of 200 g. The aforesaid mixture was stirred at room temperature for 30 to 60 minutes (about 40 minutes in this example), and then compounded twice at a temperature of 30° C. to 50° C. (about 40° C. in this example), 30 min to 60 min each time (about 30 minutes in this example). The compounded mixture was debubbled at room temperature for 20 minutes under a pressure of less than 500 Pa in the debubbing box to give the frame sealant of Example 3. The frame sealant has a viscosity in a range of 250±50 Pa·s at a temperature of 23° C. to 25° C.

Text of Puncture Resistance

The frame sealants of Examples 1 to 3 of the present disclosure were used to produce 3.97-inch liquid crystal panels, and observed punctures under a microscope. For instance, the frame sealants of Examples 1 to 3 were used as the substrate peripheral frame sealant and the sub-substrate peripheral frame sealant, respectively, and a conventional frame sealant UR-2920 (manufactured by Nippon Mitsui Chemistry) was used as the primary frame sealant. The sealants were applied at a rate of 120 mm/sec, and the width after dryness was controlled to 0.5±0.2 mm. Moreover, the amount of liquid crystal of each liquid crystal panel was 2.55 mg. Thus, the liquid crystal panels 1 to 3 of the present invention were prepared, respectively.

In a comparative experiment, each of the primary frame sealant, the substrate peripheral frame sealant and the sub-substrate peripheral frame sealant was the conventional sealant UR-2920, and other conditions were the same as above, and a comparative liquid crystal panel was prepared.

Results of Puncture Resistance Test

In the liquid crystal panels 1 to 3 prepared with the frame sealants of the examples of the present invention, there was no liquid crystal puncture at the inner side of the primary frame sealant, i.e., the whole edge of the liquid crystal side. However, in the comparative liquid crystal panel prepared with the conventional frame sealant UR-2920 as the substrate peripheral frame sealant and the sub-substrate peripheral frame sealant, there were dendritric irregular patterns at the edge of liquid crystal side of the primary frame sealant, i.e., liquid crystal punctures. Such liquid crystal punctures can cause the contamination of liquid crystal within the cell, thereby affecting the peripheral display of the display panel. Thus, it can be seen that using the frame sealants of the embodiments of the present invention can effectively prevent liquid crystal puncture, thereby improving the display effect of liquid crystal.

It is apparent that person of ordinary skill in the art can make various modifications and variations to the present invention without departing from the spirit and scope of the present invention. Thus, provided that such modifications and variations of the present invention are encompassed by the appended claims and the equivalents thereof, the present invention is also intended to encompass these modifications and variations.

The invention claimed is:

1. A frame sealant comprising 60-70 wt % of a low-viscous epoxy-acrylic photocurable resin, 1-5 wt % of an epoxy resin, 0.5-1 wt % of a photoinitiator, 5-10 wt % of a thermocuring agent, 1-2 wt % of a coupling agent, 5-10 wt % of organic powders, 5-10 wt % of inorganic powders, and 1-5 wt % of porous glass microspheres treated with nitrogen, an inert gas, or carbon dioxide.

2. The frame sealant of claim 1, wherein the frame sealant comprises 60-70 wt % of a low-viscous epoxy-acrylic photocurable resin, 3-5 wt % of an epoxy resin, 0.5-1 wt % of a photoinitiator, 8-10 wt % of a thermocuring agent, 1-2 wt % of a coupling agent, 5-8 wt % of organic powders, 7-10 wt % of inorganic powders, and 2-5 wt % of porous glass microspheres treated with nitrogen, an inert gas, or carbon dioxide.

3. The sealant of claim 1, wherein, in the porous glass microspheres treated with nitrogen, an inert gas, or carbon dioxide, the gas comprises 3-5% by volume of the porous glass microspheres.

4. The frame sealant of claim 1, wherein the low-viscous epoxy-acrylic photocurable resin is represented by the following Formula I, and has a viscosity of 100±50 Pa·s at room temperature:

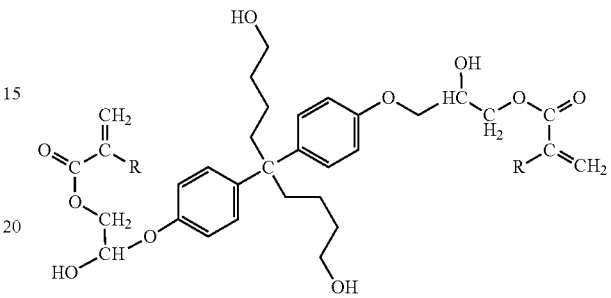

Formula I wherein each R is the same or different, and represented by H, methyl, or ethyl, respectively.

5. The frame sealant of claim 1, wherein the frame sealant has a viscosity of 250±50 Pa·s at room temperature.

6. A method of preparing the frame sealant of claim 1 comprising the steps of:
(1) mixing the components of the frame sealant to produce a mixture;
(2) compounding the mixture; and
(3) debubbling the compounded mixture.

7. The method of claim 6, further comprising the step of:
(4) adjusting the viscosity of the debubbled mixture to 250±50 Pa·s at room temperature.

8. A liquid crystal panel wherein the frame sealant of claim 1 is used as a substrate peripheral frame sealant and/or a sub-substrate peripheral frame sealant.

9. The sealant of claim 2, wherein, in the porous glass microspheres treated with nitrogen, an inert gas, or carbon dioxide, the gas comprises 3-5% by volume of the porous glass microspheres.

10. The frame sealant of claim 2, wherein the low-viscous epoxy-acrylic photocurable resin is represented by the following Formula I, and has a viscosity of 100±50 Pa·s at room temperature:

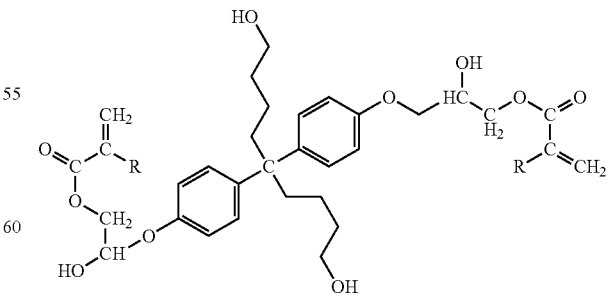

Formula I wherein each R is the same or different, and represented by H, methyl, or ethyl, respectively.

* * * * *